United States Patent [19]

Saito et al.

[11] 4,316,085
[45] Feb. 16, 1982

[54] AUTOMATIC FOCUSING ADJUSTOR DEVICE

[75] Inventors: Takeo Saito; Hiroaki Ishida; Takashi Segawa; Shinji Nagaoka; Yuzuru Takazawa, all of Shikawatashi, Japan

[73] Assignee: Seiko Koki Kabushiki Kaisha, Tokyo, Japan

[21] Appl. No.: 150,666

[22] Filed: May 16, 1980

[30] Foreign Application Priority Data

May 17, 1979 [JP] Japan .................................. 54-60819

[51] Int. Cl.³ ............................................. G03B 13/20
[52] U.S. Cl. ..................................... 250/204; 354/25
[58] Field of Search .................. 250/204, 201; 354/25; 356/4

[56] References Cited

U.S. PATENT DOCUMENTS

4,174,892 11/1979 Osawa .............................. 250/204 X

Primary Examiner—David C. Nelms
Assistant Examiner—Darwin R. Hostetter
Attorney, Agent, or Firm—Robert E. Burns; Emmanuel J. Lobato; Bruce L. Adams

[57] ABSTRACT

Automatic focusing adjustor device provided with a focusing sensor signal corresponding to an object distance by photoelectrically comparing an optical image obtainable through a fixed mirror and another optical image obtainable through a movable mirror wherein when the focusing sensor signal is not obtained, two steps of distance adjustment may be made by an output signal from a brightness sensor circuit for use in sensing a brightness of the object.

8 Claims, 12 Drawing Figures

AUTOMATIC FOCUSING ADJUSTOR DEVICE

BACKGROUND OF THE INVENTION

This invention relates to an automatic focusing adjustor device for use in a camera having a distance meter of the double image coincidence type. In this type of system, a distance scanning is performed over the object to be photographed, and an object lens is moved to a desired position corresponding to the object distance by applying the focusing sensor signal sensed by an automatic focusing sensor device for automatically sensing the focusing position. The present invention further relates to a focusing adjustment when the focusing sensor signal is not be produced.

At first, referring to FIGS. 1 and 2, the principle of operation of the automatic focusing sensor device to which the present invention may be applied will be described.

Figure 1:
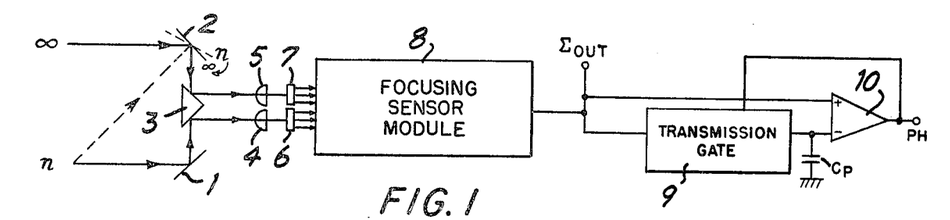
FIG. 1 shows a focusing sensor device which may be applied to an automatic focusing adjustor of the present invention.
Figure 2A:
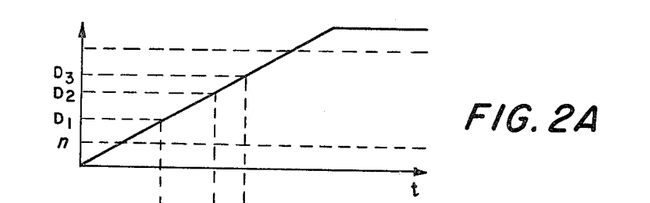
FIG. 2 shows major waveforms of signals of the focusing sensor circuit.
Figure 2B:
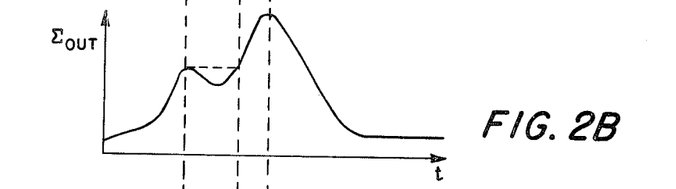
Figure 2C:
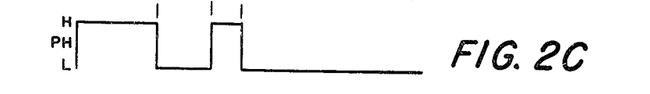

In FIG. 1 is shown a preferred embodiment of a distance measurement system and a focusing sensor circuit of an automatic focusing sensor device and in FIG. 2 is shown waveforms of each of the major signals which will be described with reference to FIG. 1.

Referring at first to FIG. 1 in which an automatic-focusing sensor device is illustrated, reference numeral 1 indicates a fixed mirror and reference numeral 2 indicates a movable mirror.

The movable mirror 2 may be rotated in an angular range extending from a position corresponding to the nearest distance (the nearest distance where photographing may be performed by a camera etc.) to the infinite distance (45° with respect to an optical axis). On the other hand, the fixed mirror 1 is set at an angle of 45° with respect to the optical axis. When the movable mirror 2 starts to rotate, as shown by the curved arrow, from the nearest position (position n indicated by dash-lines in the drawing) toward the infinite position (a position of ∞ indicated by a solid line in the drawing) in a clockwise direction, light from the object incident against each of the mirrors is reflected by a prism 3, passes through the light collecting lenses 4 and 5 and finally is received by the photoelectric transfer elements 6 and 7. Each of the photoelectric transfer elements 6 and 7 is composed of finely divided photoelectric elements and each of their outputs is fed to a well-known focusing sensor module 8. The relative relation of each of the beams of incident light represented by the photoelectric element output signals is calculated to generate an output signal ΣOUT, a so-called relative signal. The output from the module 8 is connected to a peak sensor circuit comprised of a comparator 10, a transmission gate 9 and a capacitor Cp. As shown in the drawing, the output signal ΣOUT applied to the non-inverting input (+) of the comparator 10 and to the inverting input (−) via transmission gate 9. To the inverted input of the comparator is further connected a capacitor Cp and the output terminal of the comparator 10 is connected to a control terminal of the transmission gate 9.

Operation of the comparator 10 is as follows. Off-set adjustment is set such that when the same value voltage is applied to the inverting input and the non-inverting input, its output PH will be "H". The transmission gate is set such that the same conducts when a "H" level signal is applied to the control terminal and in turn is shut off when a "L" level signal is applied to the control terminal.

Referring now to FIG. 2, the focusing process from rotation of the movable mirror 2 to a time when the focusing sensor signal is sensed will be described. FIG. 2A illustrates a curve indicating operation of the movable mirror 2, FIG. 2B illustrates the waveform of the output signal ΣOUT of the module 8 and FIG. 2C illustrates the waveform of the output signal PH of the comparator 10.

When it is assumed that some variations of the output signal ΣOUT obtained by a rotation of the movable mirror 2 are shown by the waveform in FIG. 2B, a slope or inclination of ΣOUT signal has a positive value when the movable mirror 2 starts to rotate from the nearest position to reach $D_1$, the comparator "+" input will have a higher value than the "−" input (ΣOUT signal is slightly delayed by the capacitor Cp before being applied to the "−" terminal), its output PH will become "H" level to cause the transmission gate 9 to be conductive. Since ΣOUT will have a negative slope when the movable mirror 2 is moved past a position of $D_1$, the voltage applied to the "+" input to the comparator 10 is decreased lower than that applied to the "−" input with the result that its output PH is reversed to the "L" level and at the same time the transmission gate 9 is shut off. Thus, in the capacitor Cp is stored focusing sensor module output signal (a cooperative signal) which is obtained when the movable mirror 2 is positioned at $D_1$. When the movable mirror 2 proceeds to rotate beyond the position of $D_2$, the output signal ΣOUT is a higher voltage than that stored by the capacitor Cp for the case of $D_1$, so that the comparator output PH becomes "H" level again. Further when the movable mirror 2 continues to rotate to reach a position of $D_3$ and slightly beyond that position, the output signal PH becomes "L" level again. Further even if the movable mirror 2 proceeds to rotate up to a position of "∞", the ΣOUT signal will not reach the value of the output signal obtained at a position of $D_3$, so that the output signal PH from the comparator remains "L" level. At this time, the output signal ΣOUT will reach a maximum peak value when the distribution of light incident on the fixed mirror and the distribution of light incident on the movable mirror coincide with each other during rotation of the movable mirror. The signal PH will be changed from "H" to "L" at a maximum peak value of the ΣOUT signal and produce a focusing sensor signal. The time when this signal is generated corresponds to the distance $D_3$ and this shows that the object is placed at a position of the distance $D_3$. In other word, this fact shows that a position of the movable mirror within the range from its initial position at the start of scanning to a mirror position corresponding to the final "L" level of PH signal corresponds to the object distance.

On the basis of a focusing sensor signal obtained in such a manner as described above, the object lens will be adjusted for focusing it at a desired position.

However, in such a device as described above, when the object exhibits an extremely low contrast the output signal ΣOUT will become flat shaped and will not show any peak value, so that the focusing sensor signal may not be obtained. In such a case, it has already been proposed to set a focusing adjustment to a specified position, for example, the infinite position or a normal focusing position.

However, at present, it is apparent that under some conditions the object shows an extremely low contrast, for example in such a case as when the weather shows a fine condition or the object is placed at a distant position. When the object is placed at a distant position, an expected range covered by the finely divided photoelectric elements illustrated in FIG. 1 will be expanded, and thus a brightness of incident light applied to each of the photoelectric elements will be equalized with each other, resulting in only a flat shaped ΣOUT signal being obtained.

To the contrary, when the object shows a low brightness, a low contrast always results and sometimes a peak value may not be obtained. Photographing condition when the object has a low brightness may frequently be found in such as case as when persons are to be photographed inside a room, i.e. photographing at a relatively short distance will be performed.

SUMMARY OF THE INVENTION

In view of this fact described above, it is an object of the present invention to provide an automatic focusing adjustor device capable of adjusting a different distance selected with reference to a brightness of the object for which a cooperative signal peak value may not be sensed. In order to accomplish the above object, the automatic focusing adjustor device of the present invention has a fixed and movable mirrors, a focusing sensor device in which the optical images reflected from each of the mirrors are photoelectrically compared with each other to generate a focusing sensor signal corresponding to the object distance, and when the focusing sensor signal is not obtained, a distance adjustment may be performed under two steps with reference to the output signal from a brightness sensor circuit for sensing the brightness of the object.

DETAILED DESCRIPTION OF THE PREFERRED EMBODIMENTS

Referring now to the drawings, a preferred embodiment of an automatic focusing adjustor constructed in accordance with the present invention will be described in detail.

Figure 3:
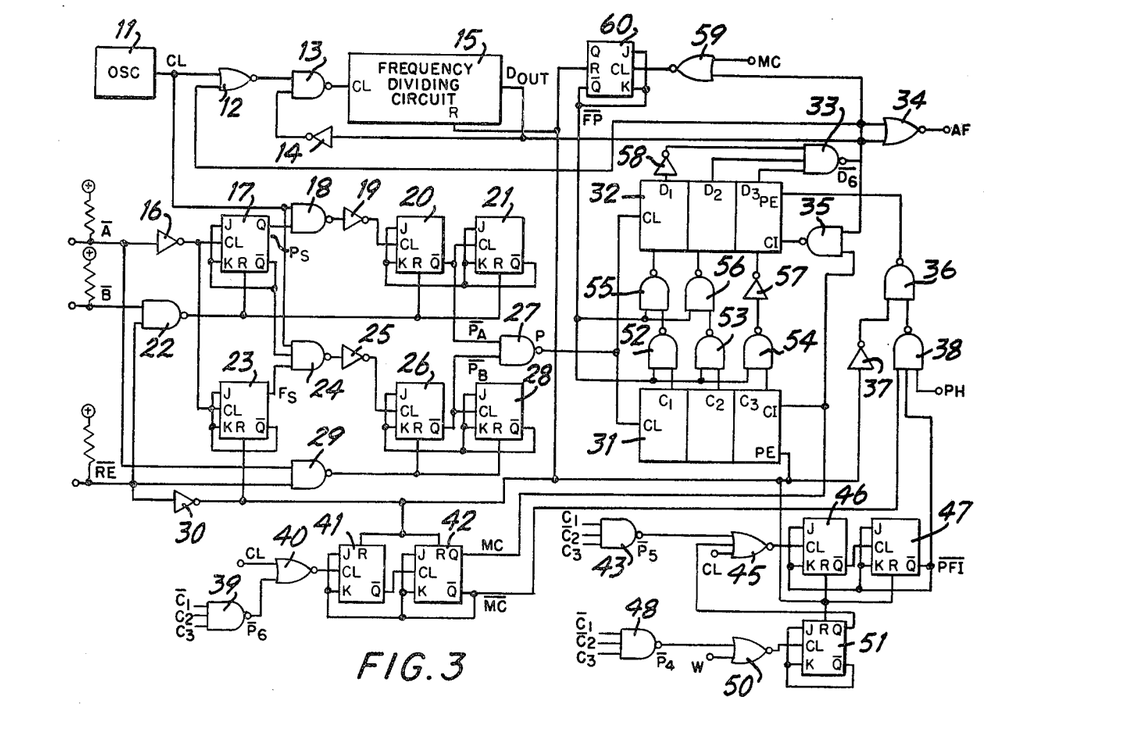
FIG. 3 shows a preferred embodiment of the automatic focusing adjustor device constructed in accordance with the present invention.

FIG. 3 shows a preferred embodiment of an automatic focusing adjustor constructed in accordance with the present invention for use in moving an object lens to a predetermined position by applying a focusing sensor signal obtained by the focusing sensor device illustrated in FIG. 1.

Figure 4:
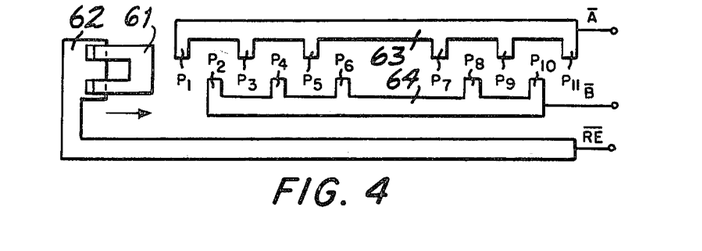
FIG. 4 shows a schematic arrangement of the switches applied to the preferred embodiment illustrated in FIG. 3.

FIG. 4 shows an arrangement of the switches to be used in the preferred embodiment of FIG. 3.

FIGS. 5, 6, 7 and 8 show major waveforms of the signals which are referred to in conjunction with the description of FIG. 3.

Referring now at first FIG. 4, wherein the reference numeral 61 indicates a contact plate which is moved from left to right in a direction shown by an arrow. Reference numerals 62, 63 and 64 show contacts each of which is connected to a respective one of the terminals $\overline{RE}$, $\overline{A}$ and $\overline{B}$ shown in FIG. 3. The contact plate 61 is kept at a ground potential and, for example as shown in FIG. 3, when the contact plate 61 is kept in contact with the contact 62, the terminal $\overline{RE}$ is set to signal level "L". The contact 63 has a plurality of contacts $P_1$, $P_3$ ... $P_{11}$, and the contact 64 also has a plurality of contacts $P_2$, $P_4$ ... $P_{10}$.

The contact plate 61 is cooperatively related with a distance setting member (not shown) and the distance setting member will start to move upon depressing of a release button of a camera. During initial movement of the distance setting member, the movable mirror 2 illustrated in FIG. 1 is also cooperatively rotated in response to the movement thereof. During subsequent movement of the distance setting member, the distance setting member will abut against a distance stopper member (not shown) to cause the distance stopper member to be rotated. When the distance setting member reaches a position corresponding to a rotational angle of the movable mirror having got the focusing sensor signal, an AF signal to be described with reference to FIG. 3 is sent out and thereby an electromagnet (not shown) will be operated to stop rotation of the distance stopper member. Along with this operation, movement of the distance setting member is also terminated. Thereafter, a focusing adjustor member (not shown) will be abutted against the distance stopper and a focusing adjustment for the object lens will be performed. The contact plate 61 is at first contacted with the contact 62 and then in sequence will be contacted with contact points, $P_1$, $P_2$, $P_3$ ... in response to a rotational angle of the movable mirror 2.

In the preferred embodiment of the present invention, it is assumed that focus may be adjusted to five positions ranging from the nearest distance to the infinite distance.

It is further assumed that a rotational angle of the movable mirror corresponds to the nearest distance when the contact plate 61 is in contact with the contact point $P_1$, to a distance $X_1$ when in contact with the contact point $P_2$, to a distance $X_2$ when in contact with the contact point $P_3$, to a distance $X_3$ when in contact with the contact point $P_4$, to an infinite distance when in contact with the contact point $P_5$ and further the contact plate 61 will be in contact with the contact point $P_6$ when the rotational angle of the movable mirror slightly exceeds the infinite distance. At this time, rotation of the movable mirror 2 is terminated.

If it is assumed that the distance stopper member is stopped when the contact plate 61 is in contact with the contact point $P_7$ due to a subsequent movement of the distance setting member, an infinite focusing adjustment is performed and similarly a focusing adjustment is made to a distance of $X_3$ when in contact with the contact point $P_8$, to a distance of $X_2$ when in contact with the contact point $P_9$, to a distance of $X_1$ when in contact with the contact point $P_{10}$, and to the nearest distance when the contact plate 61 is in contact with the contact point $P_{11}$ and further when the distance stopper member is stopped. Under the assumption just described, FIG. 3 will be described later.

In FIG. 3, reference numeral 11 indicates an oscillator for generating a clock pulse CL having a specified frequency. Reference numerals 31 and 32 indicate a presettable binary up-counter (hereinafter merely called a counter).

Since the terminals $\overline{A}$, $\overline{B}$, $\overline{RE}$ are connected to a positive or (+) terminal of a power supply as shown via resistances, they are usually kept at the "H" signal level (hereinafter the "H" signal level is called the "H" level, and the "L" signal level is called the "L" level). Terminal PH develops the same signal as that described with reference to FIG. 1. A signal generated at the AF terminal is used as a control signal for an electromagnet controlling the distance stopper member, and the terminal generates a control signal for cutting off an electric current to develop a level "H" while the output DOUT from the frequency divider circuit 15 is kept at "H" after the output signal $\overline{D_6}$ from NAND gate 33 develops a level "L", and the electric current flows to the electromagnet only during that period.

Since an "H" signal is applied to the reset terminals of FF26 and 28 via NAND gate 29 and also to the reset terminals of FF17, 20 and 21 via NAND gate 22, these flip-flops are reset. A write terminal PE of the counter 31 is kept at "H" level and the count "O" is stored in the counter. Therefore, all the outputs $C_1$, $C_2$ and $C_3$ are changed to "L". Since CARRY IN terminal CI receives the Q output of FF42 i.e. the MC signal is "L", the counter may be set to count when the output signal P is sent out from NAND gate 27. On the other hand, a terminal PE of the counter 32 is "H" due to the fact that an "L" signal is applied to NAND gate 36 via inverter 37 and writes the contents of the counter 31. Since $\overline{Q}$ output signal $\overline{FP}$ of FF60 which remains "H" is fed to one of the inputs of NAND gates 52, 53 and 54 each connected to a respective one of the outputs $C_1$, $C_2$ and $C_3$ of the counter 31, all the outputs are set to "H". And all of them are set to "L" by NAND gates 55 and 56 and inverter 57 and further fed to the counter 32, so that all the outputs $D_1$, $D_2$ and $D_3$ are set to "L", resulting in the output $\overline{D_6}$ from NAND gate 33 becoming "H" and is transmitted to NOR gate 12, so that the clock pulse CL from the oscillator 11 is not transmitted to the frequency divider circuit 15. On the other hand, the CI terminal of the counter 32 does not count the pulse P until the MC signal is reversed to "H" level due to the fact that the MC signal kept at "L" level will become "H" via NAND gate 35.

As the distance setting member is scanned and the contact plate 61 is moved away from the contact 62, terminal $\overline{RE}$ will be at the "H" level, so that this signal will become "L" level via inverter 30 and then a reset condition of each of the flip-flop circuits and the frequency dividing circuit 15 will be released.

Thereafter, when movable mirror 2 starts to rotate to the nearest position of the contact plate 61, the contact plate 61 will conntact with the contact point $P_1$ to cause the $\overline{A}$ terminal to be set to "L" level. As a result, an "H" signal will be applied to FF17 via inverter 16 to cause its Q output signal Ps to be "H" level and to latch FF17 by its Q signal. Since the Ps signal is set to "H", the clock pulse CL will cause the $\overline{Q}$ output of FF20 to be "L" via NAND gate 18 and the inverter 19. Then, a trigger of the clock pulse CL will cause the $\overline{Q}$ output of FF20 to be set to "H" level again and also the $\overline{Q}$ output of FF21 will be set to "L", and FF20, FF21 will be latched.

At this time, since there is no cooperative timing between the clock pulse CL and the time when the $\overline{A}$ terminal (also the $\overline{B}$ terminal) becomes "L", a low level condition of the PA signal generated by the $\overline{Q}$ output of FF20 is set to be synchronous with a high level condition of CL after the Ps signal is set to "H" level, and a width of pulse $\overline{PA}$ corresponds to one period of CL.

When the $\overline{A}$ signal is set to "L", FF26 and FF28 are reset again via NAND gate 29, so that the $\overline{P_B}$ signal of the $\overline{Q}$ output of FF26 is kept at the "H" level and the $P_A$ signal will become signal P via NAND gate 27 and be sent to the counter 31, resulting in its output $C_1$ being "H".

Figure 5:
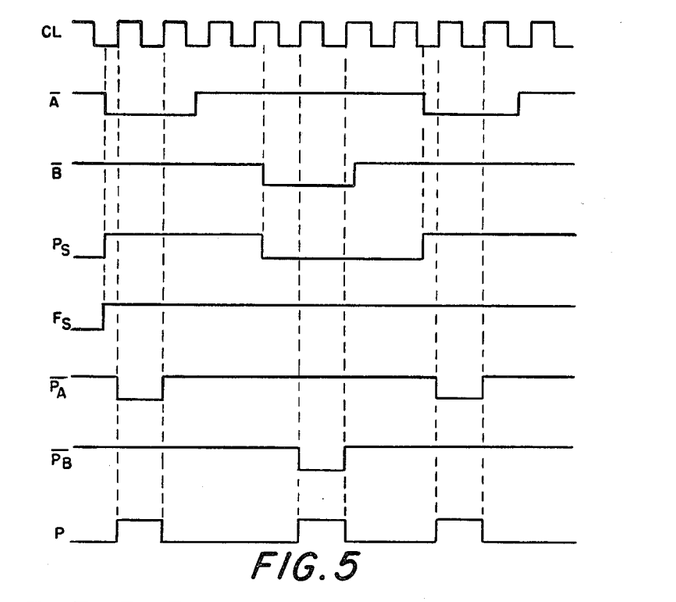
FIG. 5 shows major waveforms of signals generated in the preferred embodiment of FIG. 3.

Then as the movable mirror 2 proceeds to rotate, the contact plate 61 will contact the contact point $P_2$ and the $\overline{B}$ terminal will become "L" to reset FF17, FF20 and FF21. On the other hand, FF26 and FF28 are released from their reset condition as the contact plate 61 is moved away from the contact point $P_1$. The Q output signal Fs of FF23 will become "H" when the $\overline{A}$ terminal becomes "L" at first and will be remain as it is, so that then the clockpulse CL is fed to FF26 via NAND gate 24 and the inverter 25, signal $P_B$ similar to signal $\overline{P_A}$ will be sent out from the $\overline{Q}$ output of FF26 and become signal P via NAND gate 27, and finally signal P will be sent to the counter 31. As a result, the output $C_1$ from the counter 31 will become "L" and the output $C_2$ will become "H". In FIG. 5 is shown each of the signal waveforms when the contact plate 61 is moved past the contact point $P_3$.

Similarly as described above, every time the contact plate 61 contacts a contact point, a pulse P corresponding to a rotational angle of the movable mirror will be sent to the counter 31. The number of pulses counted corresponds to a rotational angle of the movable mirror. Every time the peak sensing signal PH becomes "H", a value at the PE terminal of the counter 32 also becomes "H" via NAND gates 38 and 36, then the contents of the counter 31 will be fed or written into the counter 32.

Figure 6:
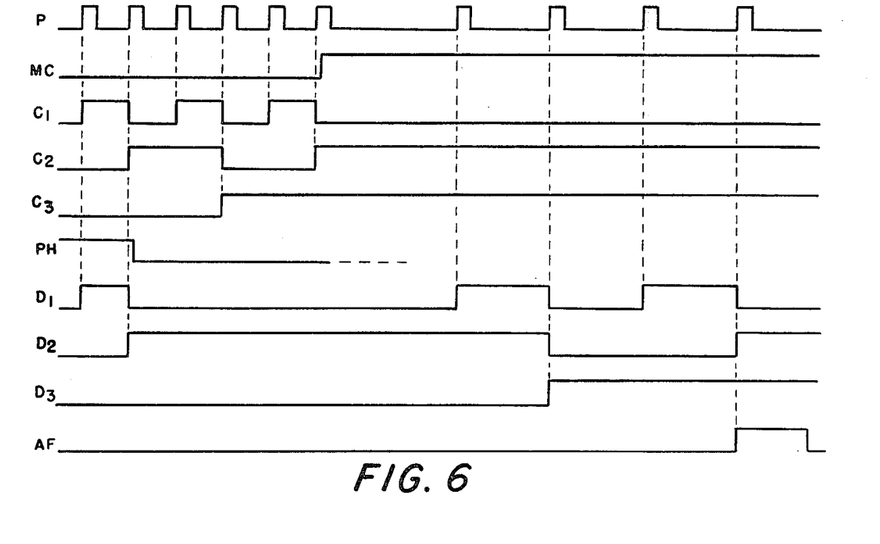
FIG. 6 shows major waveforms of signals generated in the preferred embodiment of FIG. 3.

Referring now to FIG. 6, a process in which an object distance will be set by a focusing sensor signal generated during a rotation of the movable mirror 2 will be described.

It is assumed that an object is set at a distance of $X_1$ and the PH signal at this time corresponds to the PH signal shown in FIG. 6, then a count of one is added to the counter 31 when the contact plate 61 contacts the contact point $P_1$, and further the count of one is added to the counter 32. When the movable mirror rotates further to contact the contact point $P_2$, the counter 32 will write the contents of the counter 31 therein, so that the counter 32 will contain a count of two. Subsequent to that, no writing of the count will be performed, so that the outputs $D_1$, $D_2$ and $D_3$ are kept at a level of "L", "H" and "L", respectively.

When a rotation of the movable mirror proceeds further beyond the infinite position and the contact plate 61 contacts the contact point $P_6$, the outputs $C_1$, $C_2$ and $C_3$ from the counter 31 are set to "L", "H" and "H", respectively, so that the output $\overline{P_6}$ from NAND gate 38 will become "L". At this time, $\overline{C_1}$ has a reverse signal from that of $C_1$. If $C_1$ is "L", $\overline{C_1}$ will become "H".

Since both clock pulse CL and the $\overline{P_6}$ signal are applied to NOR gate 40, the clock pulse CL is applied to FF41 via NOR gate 40 when $\overline{P_6}$ is set "L", and then the output $\overline{Q}$ signal is set to "L", and the MC signal of the Q output of FF42 will be set to "H" and the flip-flop will be latched.

As a result, the CI terminal of the counter 31 becomes "H" and the P signal transmitted by the subsequent NAND gate 37 will not be counted. On the other hand, the CI terminal of the counter 32 receives the NAND gate 35 output. When the two inputs of NAND gate 35 are "H" the output thereof is "L" resulting in a condition that enables counting of the P signal, and on the other hand, the $\overline{MC}$ signal of the $\overline{Q}$ output of FF42 becomes "L", so that the output of NAND gate 38 becomes "H". As a result, both inputs for NAND gate 36 become "H", so that the value at the PE terminal of the counter 32 becomes "L" and the writing of the contents of the counter 31 will not be performed further.

A distance stopper member starts to rotate in response to a movement of the distance setting member, the contact plate 61 will contact with the contact points $P_7$, $P_8$... and every time the contact plate is contacted with a contact point, the P signal is additionally applied to the counter 32. When the contact plate 61 is contacted with the contact point $P_{10}$, the number of counts in the counter 32 will become six, the outputs $D_1$, $D_2$ and $D_3$ of counter 32 will become "L", "H" and "H", so that the output signal $\overline{D_6}$ from NAND gate 33 will become "L" due to the fact that signal $D_1$ is set to "H" by the inverter 58. This signal is applied to NOR gate 12, so that the clock pulse CL is passed through NOR gate 12 and NAND gate 13, and then applied to the frequency dividing circuit 15 to perform frequency division of the clock pulse signal CL. On the other hand, signal $\overline{D_6}$ is applied to NOR gate 34 and the output signal AF becomes "H" to turn off the electromagnet which will be described later with reference to FIG. 9.

As a result, the distance stopper member rotation is stopped and also the distance setting member movement is terminated. Subsequent to this operation, a focusing adjustment member (not illustrated) will run up to a stopping position of the distance stopper member and finally stop at a position corresponding to the distance $X_1$.

When the output $D_{OUT}$ of the frequency divider circuit 15 is set to "H", the AF signal will become "L" again and the electromagnet will be set to ON again, resulting in a condition ready for opening and closing of the shutter to be described later.

A period in which the AF signal is set to "H" will be determined by a frequency of the clock pulse CL and a frequency of the frequency dividing circuit 15 output signal, and further will be set to such a time as to allow the electromagnet to be sufficiently turned off. In FIG. 6, the reason why a time interval for the P signals is different from that of a period for use in obtaining the focusing sensor signal (from $P_1$ to $P_6$) and that of a period for use in adjusting the distance (after $P_7$) is because in the focusing sensor process, the movable mirror is rotated at a relatively high speed to perform a focusing sensor operation to prevent a variable condition of the object (sometimes an erroneous distance measurement is performed in case unexpected other objects are found between the camera and the main object), and in the process of adjusting the distance, the specified high speed rotation of the movable mirror is not required and so the distance setting member is caused to travel or run at a relatively low speed.

Figure 7:
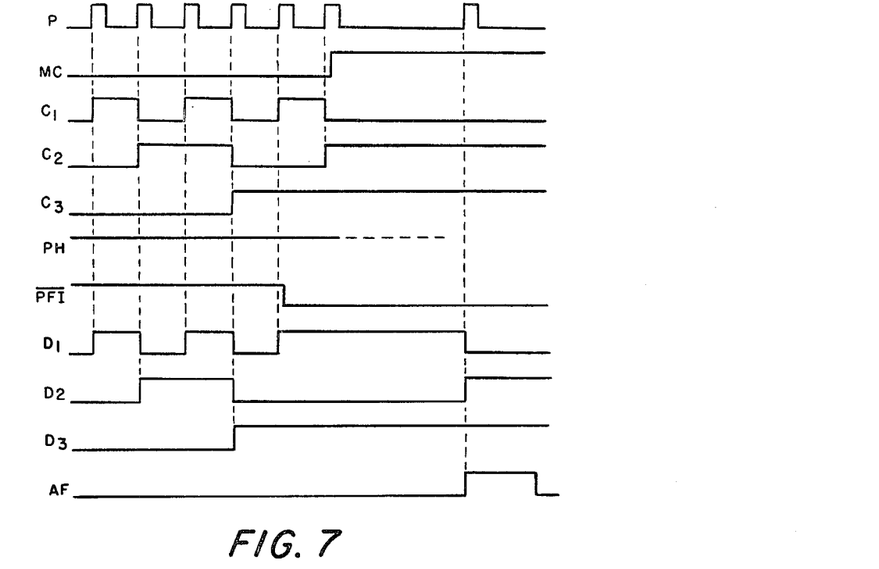
FIG. 7 shows major waveforms of signals generated in the preferred embodiment of FIG. 3 in which a brightness of the object to be photographed indicates a high value.

Referring now to FIG. 7, a focusing adjustment to be performed in the case that the object shows a high brightness and the focusing sensor signal is not obtained will be described later. In this case, the input signal W for NOR gate 50 is "H" due to a high brightness of the object.

Considering the $\Sigma$out signal for use in judging that no focusing sensor signal is obtained, (1) when all the contents of $\Sigma$out signal show a flat condition, signal PH is kept at level "H", and to the contrary (2) when signal $\Sigma$out does not reach a maximum peak value even if the movable mirror is rotated past an infinite position and further beyond that infinite position, the PH signal will be "H" at such a mirror position as at least the infinite position and a position beyond the infinite position. For convenience of the description, it is assumed that signal PH illustrated in FIG. 7 remains "H" during a rotation of the movable mirror.

In operation of the device, the output P from NAND gate 27 will be counted by the counter 31 due to a rotation of the movable mirror. Since signal PH is kept at "H", each of the outputs of the counter 31 are sent to the counter 32. When the contact plate 61 is contacted with the contact point $P_4$, NAND gate 48 receives the outputs $\overline{C_1}$, $\overline{C_2}$ and $C_3$ from the counter 31 at its respective input terminals. ($\overline{C_1}$ and $\overline{C_2}$ are inverse signals of $C_1$ and $C_2$), so that the output signal $\overline{P_4}$ will become "L" and then be sent to NOR gate 50. The output signal W of the brightness sensing circuit is applied to another input of NOR gate 50 and the output signal W of the brightness sensing circuit is kept "H", so that the output is kept "L". Therefore, the output $\overline{Q}$ of FF51 is also kept "L".

When the contact plate 61 is contacted with the contact point $P_3$, the output $\overline{P_5}$ from NAND gate 43 will become "L" and this signal will be fed to NOR gate 45. Since signal Q of FF51 and clock pulse CL are applied to NOR gate 45, as shown, the output of NOR gate 45 is changed from "L" to "H" by the "L" signal of the clock pulse CL after $P_5$ is changed from "H" to "L", then the output is fed to FF46 and its output $\overline{Q}$ is set to "L". Since the output $\overline{Q}$ of FF46 will become "H" again in synchronism with the next descending signal transition of clock pulse CL, this signal will be sent to FF47 to change $\overline{Q}$ output signal $\overline{PFI}$ from "H" to "L", and $\overline{PFI}$ is latched and remains in the same state. Since the PFI signal changed to "L" is sent to NAND gate 38, its output will become "H" and then the output from NAND gate 36 becomes "L", and the contents of the counter 31 will not be fed to the counter 32. Due to this fact, in the counter 32 is stored each of the five counts, i.e. outputs $D_1$, $D_2$ and $D_3$ kept at "H", "L" and "H", respectively.

Even if the contact plate 61 is contacted with the contact point $P_6$ and the counter 31 counts a value of six, as described above, the $\overline{PFI}$ signal is kept at "L", so that irrespective of an existence of signal PH no writing in the counter 32 is performed, and the outputs $D_1$, $D_2$ and $D_3$ from the counter 32 are kept at "H", "L" and "H". On the other hand, since the output signal $\overline{P_6}$ from NAND gate 39 is set to "L", signal $\overline{MC}$ of FF42 output Q is changed to "L" and signal MC of output $\overline{Q}$ is changed to "H". Therefore, the counter 31 does not count the subsequent P signals. On the other hand, in the counter 32, terminal CI to which the output signal from NAND gate 35 is applied is "L" and so the terminal will be set to such a condition that signal P may be counted.

Since the counter 32 is terminated to count when the movable mirror is rotated past the infinite position and the outputs $D_1$, $D_2$ and $D_3$ of the counter 32 are respectively set to "L", "H" and "H" when the contact plate 61 is contacted with the contact point $P_7$ due to a movement of the distance setting member, the output $\overline{D_6}$ from NAND gate 33 becomes "L" to cause the output signal AF from NOR gate 34 to be "H" and also cause the output from NAND gate 35 to be "H", so that the counter 32 will not add to the stored count for signal P. Since $\overline{D_6}$ signal is added to NOR gate 12, as described above, the clock pulse CL is applied to the frequency dividing circuit 15, its frequency is divided therein, the AF signal is further changed to "L" when the output signal DOUT is set to "H", and further a "L" signal is applied to NAND gate 13 via inverter 14 so that the clock pulse will not be sent to the frequency dividing circuit 15. As a result, the distance stopper member rotation is terminated, and the focusing adjustment member is moved up to a stopping position of the distance stopper member and then stopped at a place corresponding to the infinite ($\infty$) distance position.

Figure 8:
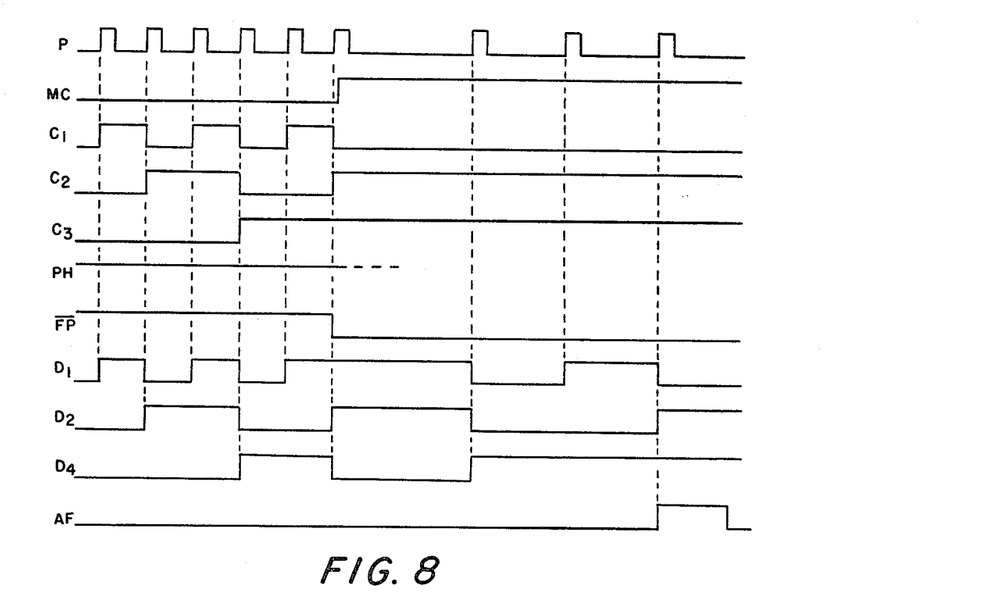
FIG. 8 shows major waveforms of signals generated in the preferred embodiment of FIG. 3 when a brightness of the object to be photographed indicates a low value.

Referring now to FIG. 8, the case when the object shows a low brightness and the focusing sensor signal cannot be obtained will be described.

In this case, it is assumed that the W signal is kept at "L" level and the PH signal, similar to that of FIG. 7, is kept at "H" during a rotation of the movable mirror. And further it is assumed that when a focusing adjustment is made to correspond to a distance of $X_2$, the focusing corresponds to a normal focusing position. (The normal focusing position is ranged for example from 2.5 m to 3.5 m.)

In operation, every time signal P is generated, the counter 31 will count the number of pulses in signal P and further, due to a condition "H" of the PH signal, the number of counts may be transferred to the counter 32. When the contact plate 61 is contacted with the contact point $P_4$, the output signal $P_4$ from NAND gate 48 becomes "L" and is fed to NOR gate 50. On the other hand, the W signal is kept at "L" level, so that the output from NOR gate 50 is changed from "L" to "H", the Q output from FF51 becomes "H" and then is kept as it is. Therefore, the contact plate 61 is contacted with the contact point $P_5$, and even if the output from NAND gate 43 becomes "L", the input of NOR gate 45 receives the "H" level Q output of FF51, so that the output will remain "L" and FF46 will not receive the clock pulse CL. Therefore, signal $\overline{PFI}$ from FF47 is kept at "H" and is not changed at all.

When the contact plate 61 is in contact with the contact point $P_6$, the counter 31 will start to count 6, then the count will be transferred to the counter 32, so that the output signals $D_1$, $D_2$ and $D_3$ will be "L", "H" and "H", respectively. Thus, the output signal $\overline{D_6}$ from NAND gate 33 will be changed from "H" to "L" and this signal will be fed to NOR gate 59. Signal MC is applied to another input of NOR gate 59, but as described above, since the MC signal is kept at "L", the output will be changed from "L" to "H" and then applied to FF60.

Therefore, the $\overline{Q}$ output signal $\overline{FP}$ of FF60 is changed from "H" to "L" and caught as it is. Each of the outputs from NAND gates 52, 53 and 54 are changed to "H" due to a change of signal $\overline{FP}$ to "L" and at the same time the outputs from NAND gates 55 and 56 will become "H". Therefore, the outputs $D_1$, $D_2$ and $D_3$ from the counter 32 will be changed to "H", "H" and "L", respectively. Therefore, the $D_6$ signal from NAND gate 33 will become "H" again. It is assumed at present that the count stored in the counter 32 is kept at three. Then, as described above, signal MC and signal $\overline{MC}$ will be changed to "H" and "L", respectively.

When the contact plate 61 is contacted with the contact points $P_7$ and $P_8$ and further with the contact point $P_9$ due to a movement of the distance setting member, the outputs $D_1$, $D_2$ and $D_3$ from the counter 32 will become "L", "H" and "H", respectively so that $\overline{D_6}$ will be changed from "H" to "L". As a result, the distance stopper member rotation is terminated, the focusing adjustment member is moved up to a stop position of the distance stopper member and further stopped at a distance corresponding to the distance $X_2$, i.e. a normal focusing position.

Figure 9:
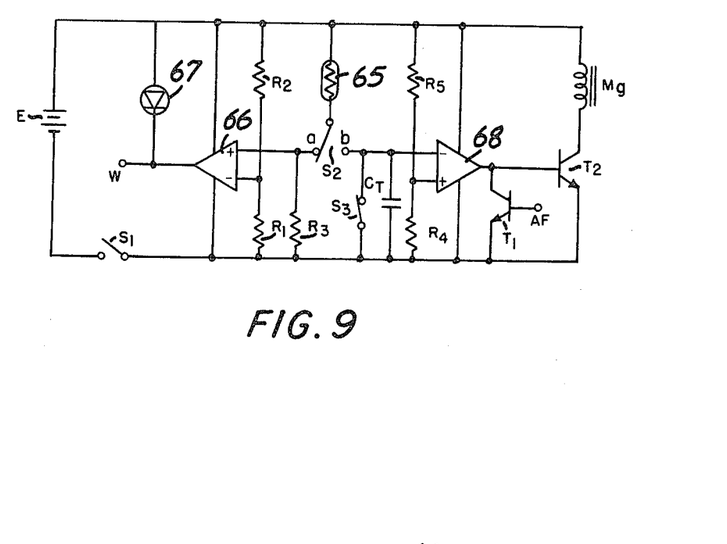
FIG. 9 shows a brightness sensor circuit including an exposure control circuit.

In FIG. 9 is shown a preferred embodiment of a brightness sensing circuit including a shutter exposure control circuit.

Reference numeral 65 indicates a light receiving element, for example, CdS, for measuring a brightness of the object to be photographed. Reference numeral 66 indicates a comparator, reference numeral 67 indicates a display element such as a LED which is connected to an output of the comparator 66. Output signal W from the comparator 66 is connected to the input of NOR gate 50 illustrated in FIG. 3. The switch $S_2$ is a changeover switch for use in changing over between the brightness sensing circuit and the exposure control circuit. Reference numeral 68 indicates a comparator. To the output from the comparator 68 is connected a base of the transistor $T_2$, and further to its collector is connected an electromagnet Mg as illustrated in the drawing. On the other hand, to the output from the comparator 68 is connected the transistor $T_1$ as shown in the drawing and to its base is connected the output signal AF from NOR gate 34 as described with reference to FIG. 3.

In operation, upon depressing of the release button of the camera, a power supply switch $S_1$ is turned on and each of the circuits receives power from a battery cell E. Electrical power will also be applied to the focusing senser circuit and the focusing adjustor device circuit as described with reference to FIGS. 1 and 3. The changeover switch $S_2$ is, as shown in the drawing, set to a side of the contact point a and a voltage divided by a reference resistance $R_3$ and the light receiving element 65 is applied to the "+" input of the comparator 66 and in turn a voltage divided by the reference resistances $R_1$ and $R_2$ is applied to the "−" input.

When the object to be photographed exhibits a low brightness, a resistance in the light receiving element 65 has a high value, so that "+" input voltage at the comparator 66 will become lower than that of "−" input voltage. At this time, the output from the comparator 66 will become "L" and the display element 67 will be lit.

On the contrary, when the objects shows a high brightness, the output from the comparator 66 will become "H" and then the display element 67 will be dimmed.

A low brightness of the object that causes the display element 67 to be lit is set to a low brightness for which the shutter exposure time is longer than that of a hand vibration of the camera operator.

As a result, when the object has a high brightness, the W signal will become "H" and to the contrary when the object has a low brightness, the W signal will become "L". Due to this fact, as illustrated in FIG. 3, when the W signal is "H" and the object brightness does not provide any focusing sensor signal, a focusing adjustment will be set to an infinite position ($\infty$) and to the contrary when the W signal is "L" and the object brightness does not provide any focusing sensor signal, a focusing adjustment will be set to a normal focusing position.

On the other hand, the "−" pole of the cell E is connected to the "−" input of the comparator 68 via timing switch $S_3$, and a voltage divided by the reference resistors $R_4$ and $R_5$ is applied to the "+" input of the comparator 68, and its output is kept at "H". Therefore, the transistor $T_2$ is turned on and the electromagnet Mg is also turned on. Since to the base of the transistor $T_1$ receives the AF signal that is kept "L", the transistor $T_1$ is turned off. Then, the electromagnet Mg is, as illustrated in FIG. 3, operated to terminate a rotation of the distance stopper member and at the same time is used to close the shutter. Thus, when the AF signal shown in FIG. 3 becomes "H", the transistor $T_1$ is turned on, the transistor $T_2$ is turned off, the electromagnet is also turned off and thereby a focusing adjustment may be performed. Thereafter, when the AF signal is set to "L" again, the transistor $T_1$ is turned off, and the electromagnet Mg is turned on to prepare for the subsequent opening and closing of the shutter.

After the focusing adjustment is performed, the change-over switch $S_2$ is changed over to b by depressing the release button and at the same time the shutter starts to open and further when the timing switch $S_3$ is turned off, the capacitor CT will be charged. When the charging voltage of the capacitor CT becomes higher than that determined by the reference resistors $R_4$ and $R_5$, the output from the comparator 68 will become "L", the transistor $T_2$ is turned off, the electromagnet Mg is turned off and the shutter will be closed.

Figure 10:
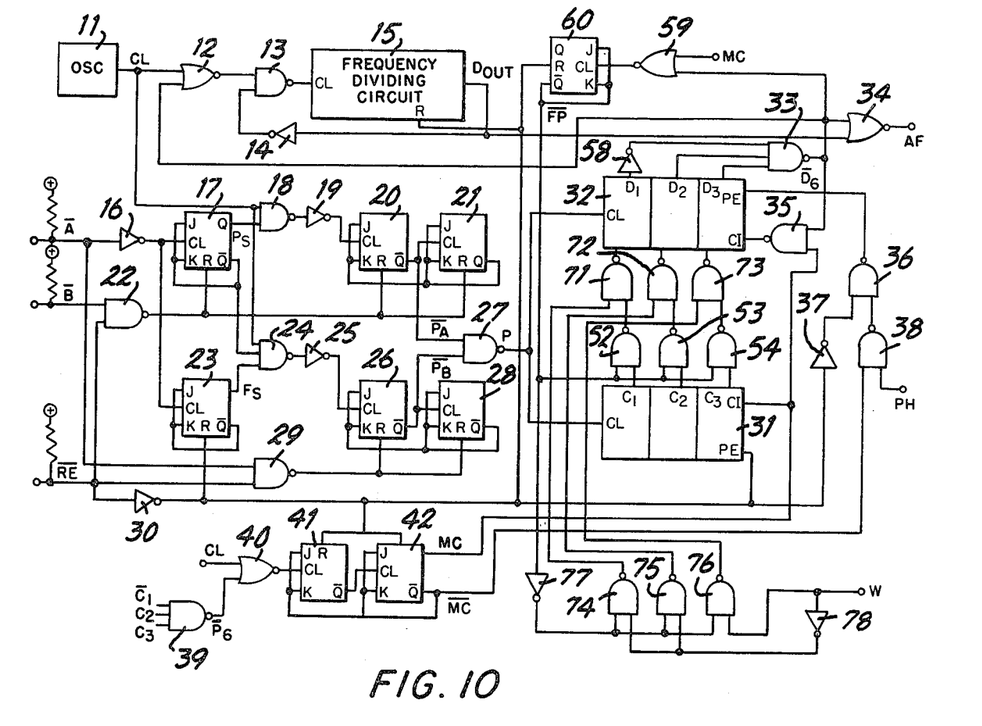
FIG. 10 shows another preferred embodiment of an automatic focusing adjustor of the present invention.

In FIG. 10 is shown another preferred embodiment of the present invention. In the previous embodiment shown in FIG. 3, the focusing adjustment was made relative to an infinite position ($\infty$) when the object brightness could not provide the focusing sensor signal and the object had a high brightness. To the contrary, in the preferred embodiment shown in FIG. 10, a focusing adjustment is made at a distance short of the infinite position (a position $X_3$ in the preferred embodiment), and a focusing adjustment is made at a normal focusing position when the object has a low brightness.

In the preferred embodiment shown in FIG. 10, the component parts FF46, FF47, FF51, NAND gate 43, NAND gate 48, NAND gate 55, NAND gate 56, NOR gate 50, NOR gate 45 and inverter 57 of the embodiment shown in FIG. 1 are not present, and NAND gates 71 to 76 and inverters 77 and 78 are connected as shown. The component parts corresponding to those shown in FIG. 3 have the same reference numerals as in FIG. 3.

In operation, when the focusing sensor signal may be provided during a process in which the movable mirror is rotated up to the infinite position ($\infty$), $\overline{Q}$ output signal $\overline{FP}$ of FF60 is set to "H", and a low level signal is applied to the inputs of NAND gates 74, 75 and 76 via inverter 77. Thus, each of the outputs $C_1$, $C_2$ and $C_3$ of the counter 31 is sent to the counter 32 while signal PH is set to "H". Subsequent operation thereof has already been described in reference to FIG. 3, so it will be eliminated.

Description will be made with respect to the case in which the object shows a high brightness and the focusing sensor signal may not be obtained. In this case, as described above, the W signal is kept at "H". Since the W signal is connected to one of the inputs of NAND gate 76, the W signal is "H", and further since the W signal is connected to one of the inputs of NAND gates 74 and 75 via inverter 78, the W signal is "L".

At present, since signal PH is "H" even if the contact plate 61 is in contact with the contact point $P_6$, the count number six counted by the counter 31 is sent to the counter 32 as it is, the outputs $D_1$, $D_2$ and $D_3$ are "L", "H" and "H", respectively, and thus output signal $D_6$ from NAND gate 33 becomes "L" and is sent to NOR gate 59. To another input of NOR gate 59 is applied signal MC and this signal MC is kept at "L", so that Q output signal FP of FF60 is changed from "H" to "L" to cause each of the outputs of NAND gates 52, 53 and 54 to be "L". On the other hand, the output from the inverter 77 becomes "H" at this time and is fed to NAND gates 74, 75 and 76, their outputs become "H", "H" and "L", respectively, and this signal is sent to NAND gates 71, 72 and 73, so that their respective outputs become "L", "L" and "H" and are applied to the counter 32, resulting in the outputs $D_1$, $D_2$ and $D_3$ of the counter 32 becoming "L", "L" and "H", respectively. Therefore, the counter 32 stores the count number of four.

Since the outputs $D_1$, $D_2$ and $D_3$ of the counter 32 become "L", "H" and "H", respectively, when the contact plate 61 is moved past the contact point $P_7$ and is positioned to be in contact with the contact point $P_8$, the output $\overline{D_6}$ from NAND gate 33 becomes "L", output signal AF from NOR gate 34 becomes "H" and as described above transmits an OFF signal to the electromagnet Mg. Therefore, the focusing adjustment is made at a position corresponding to a distance $X_3$.

The case in which the object has a low brightness and the focusing sensor signal may not be obtained will now be described.

Since the W signal becomes "L", signals having levels "H", "H" and "L" will each be applied to one of the inputs of NAND gates 74, 75 and 76, respectively.

Since signal PH is kept at "H" even if the contact plate 61 is in contact with the contact point $P_6$, similar to the case in which the object has a high brightness as described above, $\overline{D_6}$ is changed from "H" to "L" when the contact plate 61 is in contact with the contact point $P_6$, and $\overline{Q}$ output signal $\overline{FP}$ of FF60 becomes "L". Therefore, each of the outputs from NAND gates 52, 53 and 54 becomes "H" and in turn the outputs from NAND gates 74, 75 and 76 respectively become "L", "L" and "H", so that the outputs from NAND gates 71, 72 and 73 respectively become "H", "H" and "L" and also the outputs $D_1$, $D_2$ and $D_3$ from the counter 32 respectively become "H", "H" and "L". Therefore, the counter 32 is stores the count number three.

Since the outputs $D_1$, $D_2$ and $D_3$ from the counter 32 respectively become "L", "H" and "H" when the contact plate 61 is in contact with the contact point $P_9$, the output $\overline{D_6}$ from NAND gate 33 becomes "L", the output from NOR gate 34, i.e. the AF signal becomes "H" and as described above transmits OFF signal to the electromagnet. Thus, a focusing adjustment is made at a position corresponding to a distance $X_2$ i.e. a normal focusing position.

In the preferred embodiments shown in FIGS. 3 and 10, it was assumed that the number of steps for setting a distance was five steps, but it will be apparent that this number of steps is not necessarily required and the number of steps may properly be changed.

As described above, in the present invention, in case the focusing sensor signal is not be sensed, it may be expected to have a better photographing compared with that of a mere focusing adjustment relative to a definite distance due to the fact that a focusing adjustment is made at the infinite position or at a position slightly before the latter one when the object has a high brightness and in turn a focusing adjustment is made at a normal focusing position when the object has a low brightness.

What is claimed is:

1. An automatic focusing adjustor device comprising: a focus sensor device having a fixed mirror and a movable mirror in which optical images reflected from each of the mirrors are photoelectrically compared with each other to generate a focusing sensor signal corresponding to the distance to an object to be photographed; and adjusting means responsive to a condition when said focusing sensor signal is not obtained and responsive to a brightness signal representative of an object to be photographed for performing distance adjustment in two steps.

2. An automatic focusing adjustor device as set forth in claim 1, wherein said adjusting means responds to the brightness signal such that when the object has a low brightness a distance adjustment is made at a normal focusing position and in turn when the object has a high brightness, the distance adjustment is made at an infinite distance position.

3. An automatic focusing adjustor device as set forth in claim 1 or 2, further comprising brightness sensing means for sensing the brightness of an object to be photographed and for developing an electrical output signal representative of the sensed brightness of the object to be photographed.

4. In an automatic focus adjustor, the combination comprising:

focus sensing means for sensing a focused condition and for generating an electrical focus indicating signal that indicates when the focused condition is sensed; and focus distance signal generating means responsive to the electrical focus indicating signal and responsive to an electrical brightness signal representative of the brightness of an object to be photographed for generating an electrical focus distance signal representative of focus distance when said focus sensing means senses the focused condition and for generating focus distance signals representative of predetermined focus distances selected according to the brightness of the object to be photographed in the absence of a focused condition being sensed by said focus sensing means.

5. In an automatic focus adjustor according to claim 4, said focus distance signal generating means being effective to generate a focus distance signal representative of a normal focus distance when the brightness of the object to be photographed is low and to generate a focus distance signal representative of a maximum focus distance when the brightness of the object to be photographed is high.

6. In an automatic focus adjustor according to claim 4, said focus distance signal generating means being effective to generate a sequence of discrete pulse signals representative of a series of discrete focus distances.

7. In an automatic focus adjustor according to claim 6, said focus distance signal generating means comprising a first contact piece having a major length dimension and a plurality of discrete contact points disposed spaced along the length dimension of said first contact piece and each corresponding to a respective focus distance, a movable second contact piece movable along the length dimension of said first contact piece to permit said movable contact piece to contact successive ones of said discrete contact points, and counting means cooperative with said first and second contact pieces for counting the successive contacts between said discrete contact points and said movable contact piece and for developing a cumulative count representative of focus distance.

8. In an automatic focus adjustor according to claim 4, 5, 6 or 7, brightness sensing means for sensing the brightness of an object to be photographed and for developing an electrical output signal representative of the sensed brightness of the object to be photographed.

* * * * *